W. WILSON & J. H. COMBS.
Vehicle Spring Coupling.
No. 237,940.
Patented Feb. 15, 1881.
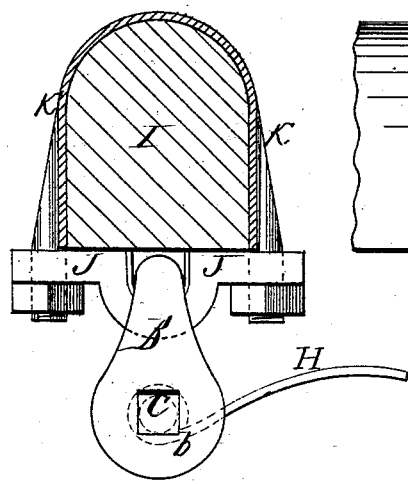
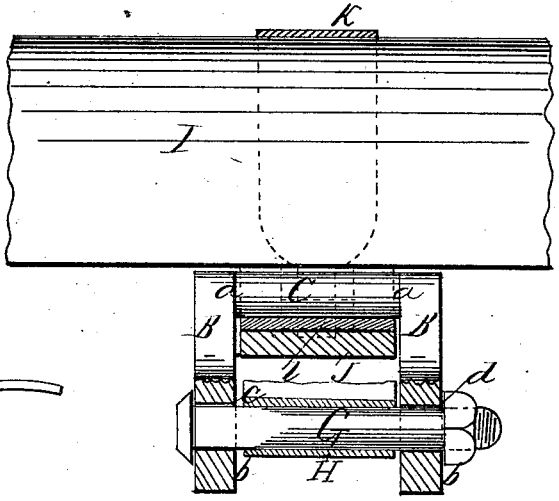
Witnesses:
Inventors:

UNITED STATES PATENT OFFICE.

WILLIAM WILSON AND JOHN H. COMBS, OF STAMFORD, CONNECTICUT.

VEHICLE-SPRING COUPLING.

SPECIFICATION forming part of Letters Patent No. 237,940, dated February 15, 1881.

Application filed October 30, 1879.

*To all whom it may concern:*

Be it known that we, WILLIAM WILSON and JOHN H. COMBS, both of the city of Stamford, in the county of Fairfield, and in the State of Connecticut, have invented certain new and useful Improvements in Vehicle-Spring Couplings; and we do hereby declare that the following is a full, clear, and exact description of our invention, enabling others to make and use the same.

The object of our invention is to provide for a cheaper, simpler, more serviceable, and more practical coupling for vehicle-springs than heretofore known or used; and it consists in the construction and novel arrangement of parts, as hereinafter shown and described.

In order to explain more fully and present more clearly our invention, we refer to the accompanying drawings, forming a part of this specification, in which—

Figure I is a front view of a vehicle-spring coupler embodying our invention. Fig. II is a side view, partly in section.

The coupling or clip is formed of the metal arms B B, joined together at $a$ $a$ by the rod or cross-piece C. By preference the coupling is cast all in one piece, and not made of three separate pieces, as heretofore. The free or unconnected ends $b$ $b$ of the coupling-arms are provided, respectively, with a square hole, $c$, and a round hole, $d$, through which passes the screw-bolt G. The object of making the hole $c$ square is to prevent the bolt from turning, and the object gained by preventing the bolt from turning is, that it prevents the same from rattling.

To the bolt G is fastened one end of the cross-spring H in such a manner that the same can turn freely around the bolt.

The joined ends of the coupling-arms are secured to the side bar, I, by the support-piece J, which forms a bearing for the coupling to swing in freely. This support-piece is fastened to the side bar, I, by the metal band or clasp K.

$l$ is a washer, placed between the coupling and bearing-piece J. The object of this washer is to prevent the wearing out of the bearing-seat in the piece J by the constant swinging movement of the coupler. The washer also preserves the bearing-piece. It can be made of anti-friction metal, and thus dispensing with the use of lubricants, and preventing the coupling from becoming inoperative.

We are aware of the fact that swinging vehicle-spring couplings are not new, and have been made the subjects of patents. We therefore do not wish to be understood as broadly claiming a swinging coupling; but, in connection with the simplicity and practicability of our invention,

Having thus fully described our invention, we desire to claim—

The combination, with the clasp K, support J, and washer $l$, of the hangers B B, vibrating in said support by rod C, and provided with square and rounded openings $c$ $d$, the bolt G, passing through said openings and conforming to the shape thereof, and the spring H, engaging said bolt, as shown and described.

WILLIAM WILSON.
JOHN H. COMBS.

Witnesses:
HENRY J. HOWELL,
JAMES R. WARREN.